United States Patent
Wirt

[11] 3,927,704
[45] Dec. 23, 1975

[54] DUAL SHEAR BLADE ASSEMBLY
[75] Inventor: Leon A. Wirt, Joliet, Ill.
[73] Assignee: Caterpillar Tractor Co., Peoria, Ill.
[22] Filed: Feb. 18, 1975
[21] Appl. No.: 550,329

[52] U.S. Cl. .............................. 144/34 E; 144/3 D
[51] Int. Cl.² ......................................... A01G 23/08
[58] Field of Search ........ 144/2 Z, 3 D, 34 R, 34 E, 144/309 AC

[56] References Cited
UNITED STATES PATENTS
3,503,429  3/1970  Whisler ............................ 144/34 E
3,731,720  5/1973  Moser et al. ........................ 144/3 D

*Primary Examiner*—Travis S. McGehee
*Assistant Examiner*—W. D. Bray
*Attorney, Agent, or Firm*—Ralph E. Walters

[57] ABSTRACT

A dual shear blade assembly for cutting through an article, includes a frame having an outwardly opening article receiving slot, a primary shear blade pivotally mounted on the frame and movable between an open position outwardly adjacent one side of the slot to a closed position across a substantial portion of the slot, a secondary shear blade pivotally mounted on the frame and movable between an open position outwardly adjacent the opposite side of the slot to a closed position across a relatively small portion of the slot, and a motor arrangement pivotally connected to the frame for swinging the primary and secondary shear blades in the same rotational direction respectively from their open positions in an opposite endward direction towards their closed positions and so constructed and arranged as to cleanly sever an article disposed in the slot with disproportionate opposite forces in order to assure that the article is positively biased toward a fully retained position within the slot.

8 Claims, 4 Drawing Figures

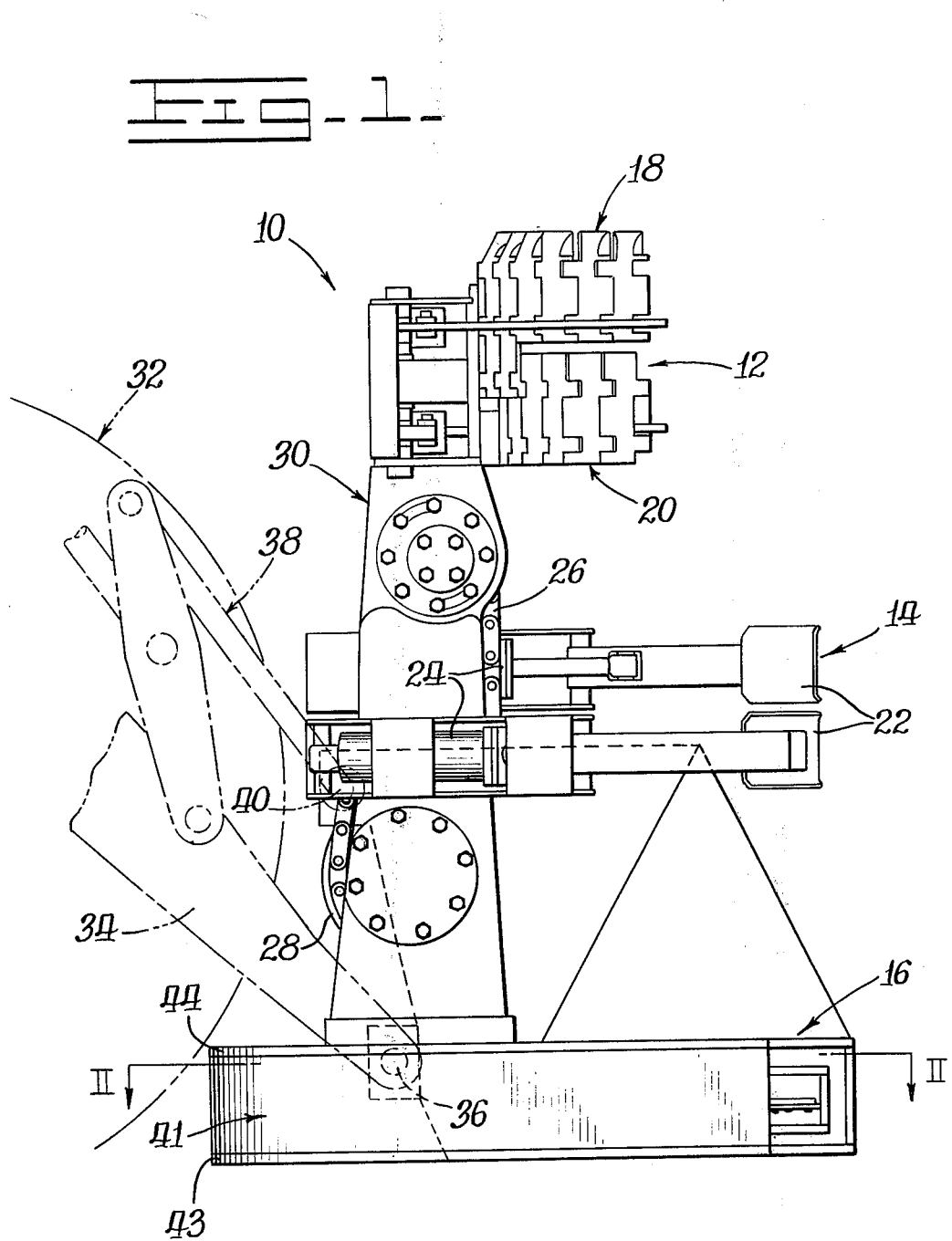

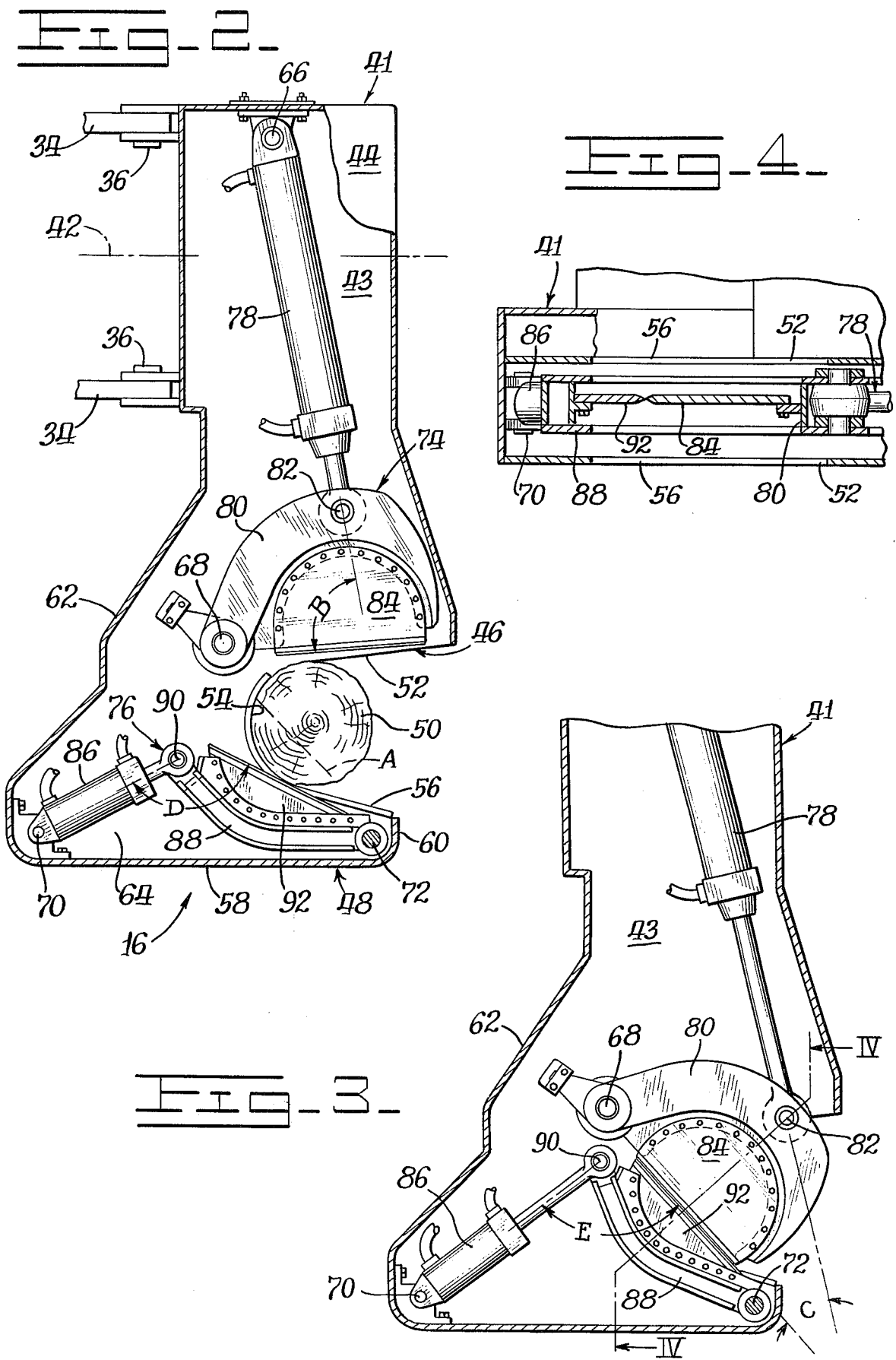

3,927,704

DUAL SHEAR BLADE ASSEMBLY

BACKGROUND OF THE INVENTION

Single blade shear assemblies of the type shown in U.S. Pat. No. 3,731,720 issued May 8, 1973 to R. L. Moser et al. and assigned to the assignee of the present invention have met with considerable acceptance in the tree harvesting industry. However, a general characteristic of these single blade shear assemblies is that there is considerably more wood damage after the single blade passes through the center of a tree trunk. Further, since forces in the range of some 80,000 lbs. are experienced when cutting relatively large trees, the blades must be longer and thicker in order to travel fully through the tree trunk while maintaining the strength of the blades. Such increased thickness also tends to tear and otherwise damage the wood that is being harvested. Another associated disadvantage is that it takes considerably more force to urge a single blade entirely through the tree.

Various dual shear blade mechanisms have been employed for tree harvesting in order to overcome the above-mentioned problems. Such mechanisms usually include two swinging blades which are arranged on opposite sides of a standing tree and then urged towards each other for cutting it. Most of these mechanisms, however, shear with a conventional scissors action wherein as the blades are pivotally closed, the generated cutting forces unfortunately tend to urge the tree out of its fully retained position. One dual shear blade mechanism attempts to overcome the disadvantages of a scissors type shear blade arrangement by pivotally mounting a pair of blades in an opposite endward manner such that one blade swings inwardly and forwardly, and the other blade swings inwardly and rearwardly in generally the same rotational direction when the tree section is being sheared. Such shearing action is disclosed in U.S. Pat. No. 3,503,429 issued Mar. 31, 1970 to E. L. Whisler. While otherwise being desirable, such construction suffers the disadvantages that the parallel sides of its tree-receiving slot and the lateral extension of the frame outwardly thereof is such as to decrease the ability of the mechanism to rapidly be maneuvered into a group of closely spaced standing trees for selective positive engagement with one of them. Not only is it relatively difficult to fully position a tree fully within the slot thereof, but also there is a tendency for the pivotally forwardly moving and closing blade to urge the tree from its fully retained position in the slot.

It should also be appreciated that due to the considerable stresses developed during cutting of a tree by the dual shear blades of U.S. Pat. No. 3,503,429 mentioned above, which may involve forces in excess of the total weight of the vehicle on which the tree harvester is mounted, the vehicle may move out of proper engagement with the tree. Such relative motion between the tree and the mechanism's slot decreases its ability to get a clean cut, and also tends to bias the tree from its vertical position where it is more difficult to handle during the subsequent processing thereof.

Any such shifting of the tree causes additional problems when the shear blade mechanism is used with other implements for further processing of the tree after it is cut. For example, the single shear blade assembly of U.S. Pat. No. 3,731,720 and mentioned above is utilized with a tree harvester having a centrally disposed drive mechanism and grapple arrangement of the type shown in U.S. Pat. No. 3,669,161 issued June 13, 1972 to N. Gutman et al., and an upper delimbing assembly of the type disclosed in U.S. Pat. No. 3,717,185 issued Feb. 20, 1973 to R. L. Moser et al., both of which are assigned to the assignee of the present invention.

SUMMARY AND OBJECTS OF THE INVENTION

Accordingly, it is an object of the present invention to provide an improved dual shear blade assembly for a tree harvester which is adapted to more cleanly sever a tree.

Another object is to provide a dual shear blade assembly of the above-mentioned type which is better able to be manipulated into a group of closely spaced trees for selecting an individual tree, and thereafter for positioning it positively into its fully retained position.

Another object of the present invention is to provide a dual shear blade assembly of the character described which has its pivotal blade connections arranged in such a manner as to provide an improved mechanical advantage for dependably holding a tree in a fully retained position within the tree harvester slot during the tree cutting operation.

Other objects and advantages of the present invention, including providing an economical, yet rugged dual shear blade assembly construction, will become more readily apparent upon reference to the accompanying drawings and the following description.

BRIEF DESCRIPTION OF THE DRAWINGS

FIG. 1 is a side elevational view of a tree harvesting apparatus including an upper delimbing assembly, a centrally disposed drive mechanism for gripping and axially shifting a tree through the delimbing assembly, and a lower dual shear blade assembly constructed in accordance with the present invention for selecting and severing the tree in an improved manner.

FIG. 2 is a horizontal sectional view of the dual shear blade assembly of the present invention taken along the line II—II of FIG. 1 showing the blades in an open tree receiving position.

FIG. 3 is a fragmentary sectional view similar to FIG. 2, but showing the blades of the dual shear blade assembly disposed in their fully closed tree severing position.

FIG. 4 is a fragmentary sectional front view of the dual shear blade assembly of the present invention taken along the line IV—IV in FIG. 3, and somewhat simplified for illustrative convenience.

DESCRIPTION OF PREFERRED EMBODIMENT

Referring particularly to FIG. 1, a preferred embodiment of a tree harvesting apparatus 10 constructed in accordance with the present invention includes an upper delimbing assembly 12, a centrally disposed drive mechanism 14 for gripping a tree to be processed and subsequently axially shifting it through a lower dual shear blade assembly 16, which is the subject of the present invention. The delimbing assembly 12 and the drive mechanism 14 are described in detail in aforementioned U.S. Pat. Nos. 3,717,185 and 3,669,161, respectively. It is sufficient to note that the delimbing assembly preferably has a pair of flexible blades 18 and 20 which are sharpened along one edge and may be brought into cutting engagement about the circumference of a tree for cutting limbs from the tree as it is shifted axially therethrough. With regard to the drive mechanism, it includes a pair of gripping arms or grapples 22 which may be moved in opposition to each other by a pair of hydraulic jacks 24 in order to firmly secure the tree against an endless drive track chain assembly 26 arranged for rotation upon the tree harvesting apparatus through various rollers and sprockets, one of which is partially shown at 28.

As is apparent in the drawing, the upper delimbing assembly 12, the central drive mechanism 14, and the lower dual shear blade assembly 16 of the present invention are all supported upon a common frame structure 30 which is mounted on the front end of a vehicle 32 such as partially shown in phantom. The vehicle is of the wheel loader type having a pair of laterally spaced lift arms 34, and with the frame structure 30 secured thereto through a pair of horizontally arranged pivots 36. A pair of laterally spaced, conventional tilt linkage mechanisms 38 are also mounted on the vehicle and the lift arms for pivotal connection to the frame structure at a pair of upper pivots 40. In this way, the tilt linkage mechanism is effective to pivot the frame structure, and thereby the entire tree harvesting apparatus 10, about the lower pivots 36.

More particularly, and as best shown in FIG. 2, the dual shear blade assembly 16 of the present invention includes a laterally elongated boxlike frame 41 which extends laterally outwardly in an offset manner relative to a central longitudinal axis 42 of the vehicle 32. The boxlike frame includes a lower plate member 43 and an upper plate member 44 substantially parallel thereto, and a forwardly divergingly opening slot 46 is defined therein adjacent the outermost corner thereof in convenient tree-receiving relation. As will be hereinafter appreciated, this slot is cooperatively associated with a forwardly converging slender jaw 48 for aiding delivery of a tree, such as indicated at 50, fully into the slot. The frame or plate member boundaries of the slot are defined by a pair of vertically separated inclined inner sidewall edges or sides 52 which extend rearwardly for tangent cooperation with a corresponding pair of arcuate tree-receiving rear walls 54, and a pair of inclined entry ramps or sides 56 which extend forwardly therefrom in a tangent manner to form a common boundary with the slender jaw. An outermost sidewall 58 and a laterally narrow nose or apex portion 60 span vertically between the plate members and cooperate with the inclined entry ramps to define the principal boundaries of the jaw. The outermost sidewall extends rearwardly and laterally inwardly to communicate with an obliquely inclined rear wall 62 for the purpose of providing a jack-receiving trailing leg portion or cavity 64 within the boxlike frame.

In accordance with the present invention, a number of advantages accrue from the particular location and disposition of a pair of substantially laterally aligned upright pivots 66 and 68, and a pair of substantially longitudinally aligned upright pivots 70 and 72 appropriately removably secured to the boxlike frame 41 as best shown in FIG. 2. Upon viewing the drawing, it will be seen that a laterally elongated primary shear blade arrangement 74 is pivotally mounted on the pivots 66 and 68, while a longitudinally foreshortened secondary shear blade arrangement 76 is pivotally mounted on the pivots 70 and 72. The primary shear blade arrangement includes an elongated reciprocable hydraulic jack 78 which is rotatably anchored to the pivot 66 and a primary shear blade member 80 similarly anchored to the frame at the pivot 68. It is clearly apparent that the hydraulic jack is coupled to the primary shear blade member at a pivot 82 for swinging operation thereof, and also that the blade member includes a relatively large and replaceable primary shear blade 84. In a somewhat similar manner, the secondary shear blade arrangement 76 includes a foreshortened reciprocable hydraulic jack 86 of smaller diameter than the primary jack which is pivotally anchored to the frame by way of the pivot 70, and is further secured to a secondary shear blade member 88 at a pivot 90 in order to arcuately move it about the pivot 72. The secondary shear blade member includes a relatively small or narrow secondary shear blade 92 which is removable therefrom in a conventional manner for replacement or servicing purposes.

Operation

While the operation of the present invention is believed clearly apparent from the foregoing description, further amplification will subsequently be made in the following brief summary of such operation. With reference to FIG. 2, the dual shear blade assembly 16 of the present invention is shown with the hydraulic jacks 78 and 86 in their fully retracted positions so that the primary shear blade member 80 and the secondary shear blade member 88 are both rotated about their respective pivots 68 and 72 in a fully counterclockwise manner. In this way the primary shear blade 84 and secondary shear blade 92 are disposed in their fully open positions outwardly adjacent the opposite sides 52 and 56 of the slot 46.

When the dual shear blade assembly 16 is in the open position shown in FIG. 2, the tree harvesting apparatus 10 may be maneuvered by the vehicle 32 to a point where the forwardly converging slender jaw 48 is conveniently positioned laterally outwardly of one tree in a group of relatively closely spaced trees. Thereafter, additional forward movement of the vehicle causes the tree to be easily positively positioned fully rearwardly in the converging slot 46 by way of either the inclined entry ramps 56 or the opposite inner sidewall edges 52.

Upon reaching its fully retained position in the slot 46, the grapples 22 of the drive mechanism 14 are actuated in an opposing closing manner to clasp the upright tree against the frame structure 30. The hydraulic jacks 78 and 86 are then simultaneously operated in parallel to extend them and move the primary and secondary shear blades 84 and 92 towards their closed, tree shearing positions in a generally coplanar manner as is clearly disclosed in FIG. 4.

As best noted in a comparison of FIGS. 2 and 3, extension of the jacks 78 and 86 causes simultaneous clockwise rotation of the primary shear blade member 80 about the pivot 68 and the secondary shear blade member 88 about the pivot 72 in an opposite endward closing manner. It is significant to note that in accordance with one of the principal objects of the invention, the primary shear blade exerts more force than does the secondary shear blade during its more extensive penetrating cutting engagement with the tree, which greater force tends to positively maintain the tree fully rearwardly in the slot 46. On the other hand, the secondary shear blade 92 specifically cuts the tree through a lesser amount and with a lesser force because of the smaller diameter of the hydraulic jack 86 and mechanical advantages due to the locations of the pivots 70, 72, and 90, and associated member 88. Therefore, the secondary shear blade beneficially exhibits less tendency to bias the tree outwardly of the slot.

Thus, the dual shear blade assembly 16 of the present invention is adapted to cleanly penetratingly cut a relatively large tree with disproportionate force and to a disproportionate degree as shown in FIG. 2. In the representative example shown, the primary and secondary shear blades 84 and 92 penetrate through approximately 75 and 25% of the tree section as indicated by the broken line identified with the letter A. The secondary shear blade arrangement 76 is pivotally movable to its fully closed position as shown in FIG. 3 prior to full closure of the primary shear blade arrangement 74 under normal cutting engagement with a large tree. At such a point, the hydraulic jack 86 reaches the end of its stroke, while the other jack 78 continues to extend to complete the closing cutting engagement of the blades.

Thus, it is evident that the dual shear blade assembly of the present invention provides an asymmetrical system of opposing primary and secondary shear blade arrangements with specifically proportioned pivot point connections, lever arms and forces that assures positive rearward biasing of the tree to a fully retained position in the slot during the clean severing action thereof. Further, the asymmetric offset relationship is coupled with an outwardly divergingly opening slot and forwardly convergingly associated slender jaw for more convenient manipulation of a tree fully rearwardly into the slot.

Another feature of the dual shear blade assembly of the present invention is the desirably high mechanical advantage of the relation between the hydraulic jacks 78 and 86 and their respective primary and secondary shear blade members 80 and 88. As shown in FIGS. 2 and 3, the jack 78 operates through a range of acute angles identified by the letters B and C, respectively, that progresses from approximately 85° to 30° with extension thereof, while the jack 86 operates through a range of obtuse angles identified by the letters D and E, respectively, that progresses from approximately 125° to 95° with extension thereof. Consequently, the primary shear blade members and associated jack are pivotally associated so that the initial closing force is directed therethrough at substantially a very desirable right angle and in generally transverse relation to the slot 46, and the secondary shear blade member and associated jack are pivotally associated in such a manner that during closing thereof the forces operate through a range of obtuse angles approaching a desirable right angle and in general alignment with the slot in order to maximize the effective mechanical advantages thereof.

While the invention has been described and shown with particular reference to a preferred embodiment, it will be apparent that variations might be possible that would fall within the scope of the present invention, which is not intended to be limited except as defined in the following claims.

What is claimed is:

1. A dual shear blade assembly for cutting through an article, comprising;
   a frame having an outwardly opening article receiving slot therein;
   primary shear blade means pivotally mounted on said frame and movable between an open position outwardly adjacent one side of said slot to a closed position across a substantial portion of said slot;
   secondary shear blade means pivotally mounted on said frame and movable between an open position outwardly adjacent the opposite side of said slot to a closed position across a relatively small portion of said slot; and
   motor means pivotally connected to said frame for swinging said primary and secondary shear blade means in the same rotational direction respectively from said open positions in an opposite endward manner towards said closed positions and so constructed and arranged as to cleanly sever an article disposed in said slot with disproportionate opposite forces in order to assure that the article is positively urged toward a fully retained position within said slot.

2. A dual shear blade assembly for a tree harvester, comprising;
   a frame having a forwardly divergingly opening slot defined therein and a forwardly converging slender jaw associated therewith for aiding delivery of a tree fully into said slot;
   primary shear blade means pivotally mounted on said frame and including a primary shear blade member movable from an open position outwardly adjacent one side of said slot to a closed position across a substantial portion of said slot for obliquely rearwardly directed penetrating cutting engagement with the tree; and
   secondary shear blade means including a secondary shear blade member pivotally mounted on said frame and disposed within said slender jaw when in an open position and movable from the open position outwardly adjacent the opposite side of said slot to a closed position across a lesser portion of said slot for obliquely forwardly directed clean penetrating cutting engagement with the tree at a lesser force than said primary shear blade means so that the tree will be dependably urged rearwardly into its fully retained disposition within said slot.

3. The dual shear blade assembly of claim 2 wherein said slender jaw includes an inclined entry ramp contiguous with said opposite side of said slot for providing effective sliding entry of the tree therein.

4. A dual shear blade assembly for a tree harvester, comprising;
   a frame having a forwardly divergingly opening slot defined therein and a forwardly converging slender jaw associated therewith for aiding delivery of a tree fully into said slot;
   primary shear blade means pivotally mounted on said frame and including a primary shear blade member and an elongated hydraulic jack operationally effective to move it from an open position outwardly adjacent one side of said slot to a closed position across said slot and penetratingly through a majority of a large tree disposed in said slot; and
   secondary shear blade means including a secondary shear blade member pivotally mounted on said frame and disposed within said slender jaw when in an open position and including a foreshortened hydraulic jack which is operationally effective to move said secondary shear blade member from the open position outwardly adjacent the opposite side of said slot to a closed position across a portion of said slot and penetratingly in an opposing manner through a minority of the large tree.

5. The dual shear blade assembly of claim 4 wherein said foreshortened hydraulic jack is pivotally mounted intermediate said frame and said secondary shear blade member and operationally extendable through a range of obtuse angles approaching a right angle relative to said secondary shear blade member for maximizing the effective mechanical advantage thereof during cutting engagement with the tree.

6. A dual shear blade assembly for a tree harvester, comprising;
   a laterally elongated frame having a forwardly diverging opening slot therein and including a pair of substantially laterally aligned upright pivots and a pair of substantially longitudinally aligned upright pivots,
   a first shear blade pivotally mounted on one of said laterally aligned pivots and movable between an open position outwardly adjacent one side of said slot obliquely rearwardly to a closed position across said slot,
   an elongated hydraulic jack pivotally mounted on the other one of said laterally aligned pivots and connected to said first shear blade for moving it rearwardly toward its closed position into cutting engagement with a tree,
   a second shear blade pivotally mounted on one of said longitudinally aligned pivots and movable between an open position outwardly adjacent the opposite side of said slot obliquely forwardly to a closed position across a relatively small portion of said slot, and
   a foreshortened hydraulic jack pivotally mounted on the other one of said longitudinally aligned pivots and connected to said second shear blade for relatively limitedly moving it towards its closed position and so constructed and arranged as to assure that it effectively applies less force on said second shear blade than applied by said elongated hydraulic jack on said first shear blade in order to assure that the tree will be urged inwardly to a fully retained position within said slot as the tree is cleanly severed.

7. The dual shear blade assembly of claim 6 wherein said frame includes a forwardly converging jaw including an inclined entry ramp contiguous with said opposite side of said slot for effectively guiding the tree fully into said slot.

8. The dual shear blade assembly of claim 7 wherein said second shear blade is compactly disposed within said jaw when in its open position and has a relatively limited range of pivotally closing forward movement therefrom.

* * * * *